United States Patent

Drexler et al.

[15] 3,691,416
[45] Sept. 12, 1972

[54] FLEXIBLE SUPPORT STRUCTURE FOR END WINDING CONNECTIONS

[72] Inventors: Karl F. Drexler, Burnt Hills; Edward E. Gibbs, Schenectady, both of N.Y.

[73] Assignee: General Electric Company

[22] Filed: June 14, 1971

[21] Appl. No.: 152,698

[52] U.S. Cl. .................................. 310/260, 310/270
[51] Int. Cl. ............................................... H02k 3/46
[58] Field of Search ............................. 310/260, 270

[56] References Cited

UNITED STATES PATENTS

| | | | |
|---|---|---|---|
| 3,089,048 | 5/1963 | Bahn et al. | 310/260 |
| 3,344,297 | 9/1967 | Bishop et al. | 310/260 |

FOREIGN PATENTS OR APPLICATIONS

| | | | |
|---|---|---|---|
| 853,251 | 11/1960 | Great Britain | 310/260 |

*Primary Examiner*—D. X. Sliney
*Attorney*—William C. Crutcher et al.

[57] ABSTRACT

In a dynamoelectric machine, an insulating end winding support providing unidirectional flexibility in response to axial thermal excursions of the end winding members. An insulating support ring is concentrically mounted on the dynamoelectric machine while a floating outer support is fixed to the end winding members. A spacer is positioned between the first support ring and the floating support and a kinked tie wrap is secured around the first support ring, the floating outer support and the spacer. A second embodiment requires the use of two concentrically mounted support rings with a spacer there between secured with a kinked tie wrap. A third embodiment discloses a flanged support ring and a "phase jumper" with a spacer there between secured by a kinked tie wrap.

11 Claims, 5 Drawing Figures

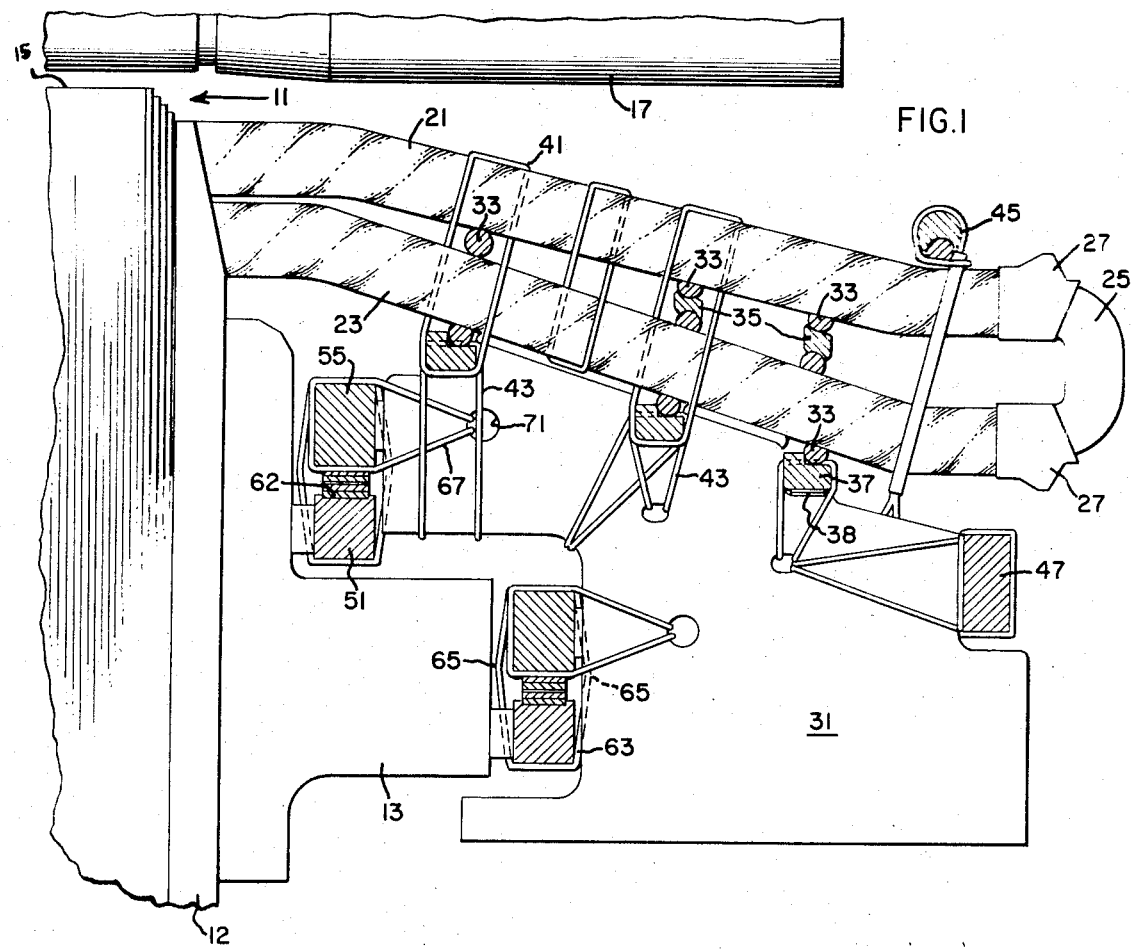
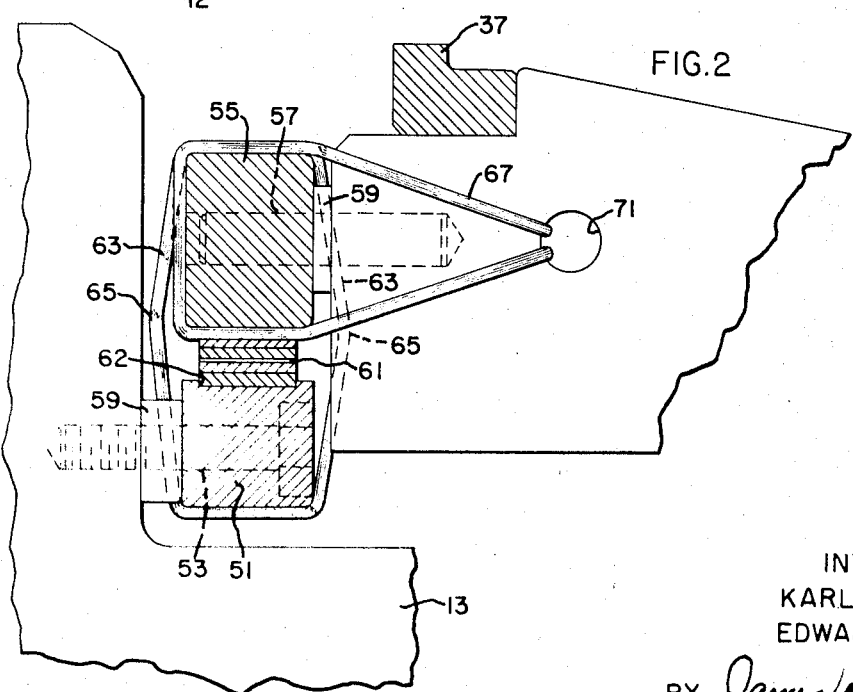
INVENTORS:
KARL F. DREXLER,
EDWARD E. GIBBS,
BY James W Mitchell
THEIR ATTORNEY.

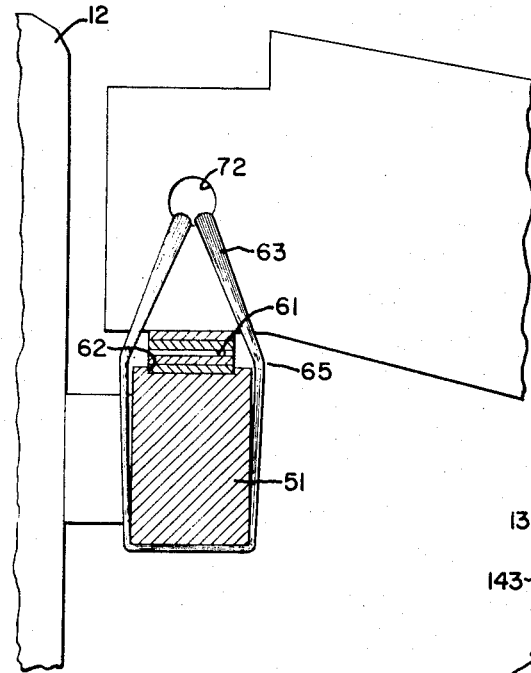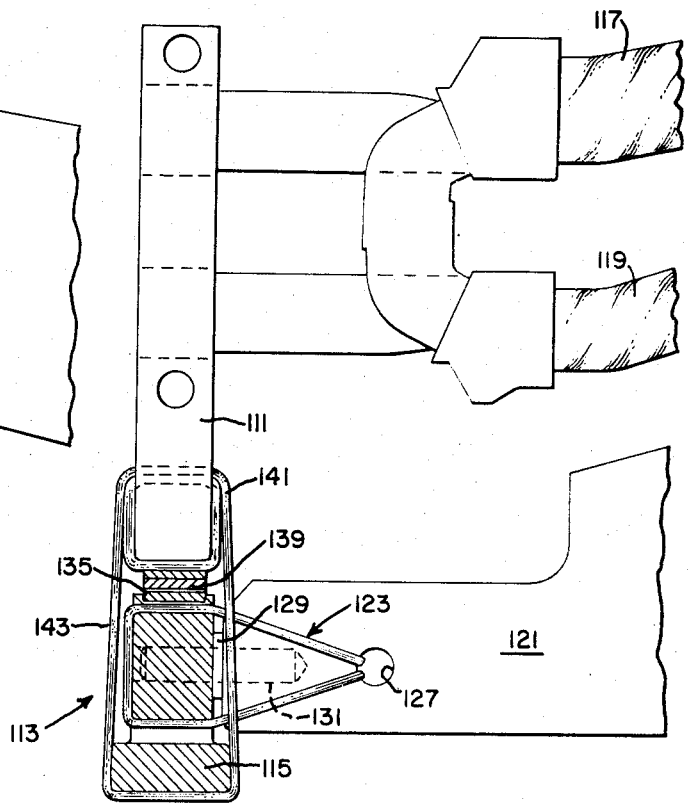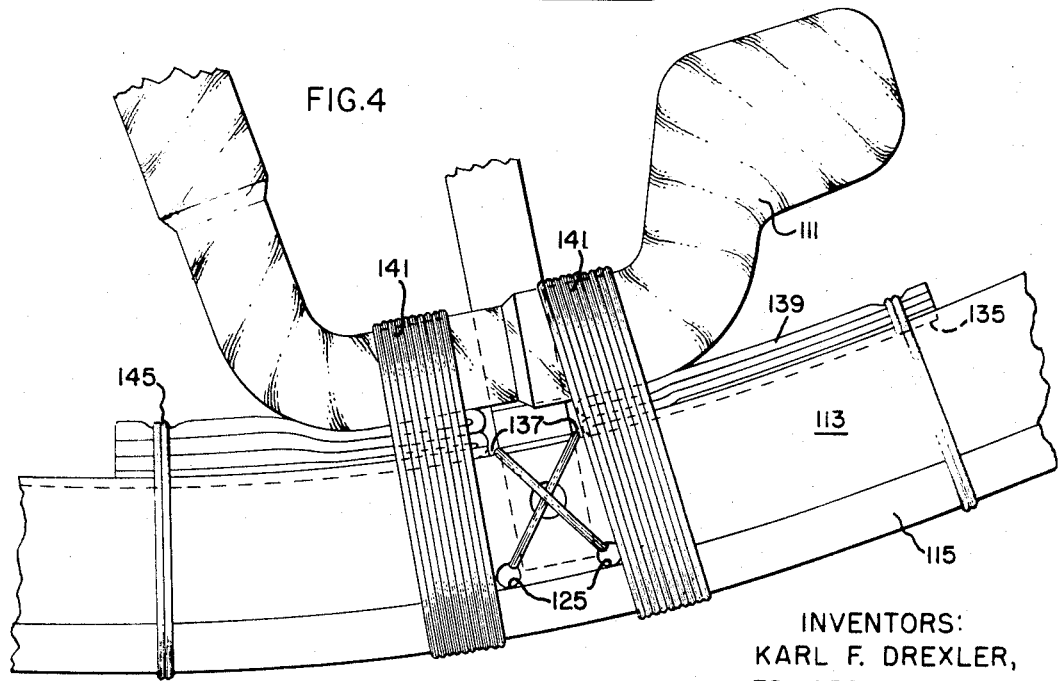

FLEXIBLE SUPPORT STRUCTURE FOR END WINDING CONNECTIONS

BACKGROUND OF THE INVENTION

This invention relates generally to a support structure for use in the end winding region of a dynamoelectric machine and more particularly relates to an insulating unidirectional flexible support structure which provides radial constraint while simultaneously allowing limited movement in the axial direction.

The end windings of a dynamoelectric machine are the projecting portions of the stator bars which extend outwardly from slots in the stator core. The purpose of end windings is to reverse the direction of stator bars. One type of end winding, known as a "series loop" is used to reverse the direction of an emerging stator bar and to circumferentially displace the bar so that it may re-enter the stator core in a slot which may be 120° to 180° circumferentially displaced from the slot from which it emerged. Another type of end winding is a phase jumper which is used for limited circumferential displacement, perhaps in order of 30°, when it is required by the phase winding pattern. An end turn region may have a number of stator bars emerging from the stator core slots, the bar ends of which have to be interconnected, insulated and supported. Typically, in large dynamoelectric machines, two stator bars are located in each stator slot.

The support of the end windings of a dynamoelectric machine is a complex problem when viewed in the perspective of a complicated series of loops and convergent, divergent and skewed stator bar ends. Further, the support structure must be able to withstand electromagnetic forces, vibrational forces and thermal forces applied by the dynamoelectric machine. Thermal forces cause axial expansion of the stator bars which would cause an undesirable stress buildup in the stator bars if the thermal expansions were rigidly restrained. However, U.S. Pat. No. 3,089,048 granted to Bahn et al., on May 7, 1963 and assigned to the assignee of this invention, discloses an expandable bracket which allows for thermal breathing. A support member, made of an insulating material, is fixed to the stator frame by means of metal brackets. This type of construction is costly requiring special parts and because of the use of metal brackets instead of insulated tie wraps, it is inconsistent with the general end winding insulation scheme of the dynamoelectric machine.

OBJECTS OF THE INVENTION

Accordingly, it is an object of the present invention to provide an improved, high strength, insulating support system for stator end windings in an electrically highly stressed region while allowing for axial thermal expansion within the end winding.

It is another object of this invention to retain vibrational forces between support and end windings in radial, tangential and axial directions by sufficiently rigid integration.

It is another object of this invention to eliminate the use of metal as a construction component in the end winding support system, thus producing a truly insulated end wind support.

It is still another object of the present invention to provide easy adjustment for any variance in clearance between the support ring and the end winding connection.

Other objects, advantages and features of the present invention will become apparent from the following detailed description of the various embodiments thereof taken in connection with the accompanying drawing.

BRIEF DESCRIPTION OF THE DRAWINGS

FIG. 1 is a partial elevation view of the side of one end of a dynamoelectric machine showing the end winding region with the present invention applied thereto.

FIG. 2 is an enlarged side elevation view of the present invention.

FIG. 3 is an enlarged side elevation view of an alternate embodiment of the present invention.

FIG. 4 is a partial front elevation view of one end of a dynamoelectric machine having a phase jumper applied thereto along with the present invention.

FIG. 5 is a side elevation view of one end of a dynamoelectric machine showing the phase jumper applied thereto along with the present invention.

SUMMARY OF THE INVENTION

An insulating support structure for use in the end winding region of a dynamoelectric machine, which restrains the end windings in the radial direction while permitting limited movement in the axial direction. In one embodiment, at least one pair of support rings having relatively slight differences in diameters are mounted in a substantially concentric relationship with the stator core. One support ring is fixed to an axial support in the form of a circular flange on the dynamoelectric machine frame while the other support ring is fixed to a floating outer support member to which end windings are attached. Interposed strategically between the rings may be a plurality of spacers at which points the rings are tied together by a resin impregnated glass tie. The tie is formed with a slightly kinked portion which allows for axial movement while restraining radial movement.

DETAILED DESCRIPTION OF THE INVENTION

Referring now to the drawings, and particularly referring to FIG. 1, there is shown a partial side elevation view of the end winding region at one end of a dynamoelectric machine 11. The stator core 12 includes a circumferential flange 13. Turning within a bore 15 in the stator core is the dynamoelectric machine rotor 17.

Upper 21 and lower 23 stator bars emerge from the stator core slots (not shown) and along with a series loop 25 determine part of the end winding region. FIG. 1 shows the stator bars and the series loop all to be in the same plane but this is done only for the sake of convenience and simplification in drawing the invention. In practice, the two connected stator bars and the series loop would all be found in different planes. Bar clips 27 may be used to join the stator bar ends and the series loop connection.

The manner in which the upper and lower stator bars are fixed to the outer floating support 31 will be reviewed briefly since a variety of tie systems may be used. One such tie system is shown in U.S. Pat. No. 3,089,048 granted to Bahn et al., and assigned to the assignee of the present invention as previously cited. Another example of a tie system in the end turn region is shown in U.S. Pat. No. 3,344,297 granted to Bishop et al., on Sept. 26, 1967 and assigned to the assignee of the present case.

In the present case, the upper and lower stator bars have a combination of conformable spacers 33 and "Z" rings 35 interposed between the bars in order to add rigidity to the end winding structure. Interposed between the lower bar 23 and the outer floating support 31 are a plurality of "L" rings 37 having conformable spacers 33 mounted thereon. Upper bands ties 41 are wrapped about the upper and lower stator bars and the "L" rings while lower band ties 43 are wrapped about the "L" rings (and shims 38 where needed) and the outer floating support. Thus the tie about the common "L" rings joins the stator bars and the floating support. Additionally the stator bars and the outer floating support are joined by glass bolt strap 45. A resin impregnated fiber glass ring 47 may be secured to the floating outer support 31, which may be made of resin impregnated laminates in a manner disclosed in U.S. Pat. No. 3,566,010 issued Feb. 23, 1971 to Drexler and Bishop, and assigned to the assignee of the present invention.

One embodiment of the present invention is best illustrated in detail in FIG. 2. A first supporting ring 51 concentric with the stator core, is fixed to the circumferential flange 13 by means of a screw 53, while a smaller second support ring 55, also concentric with the stator core, is fixed to the floating outer support 31 by means of a dowel 57. A spacer 59 is positioned between the flange 13 and the first support ring 51; a similar spacer is positioned between the outer support 31 and the second support ring. These spacers 59 may be formed from resin impregnated laminates.

A "sandwich" spacer 61 is positioned between the first and second support rings and held in a groove 62 formed in the first support ring. A rubber sheathed "Glaskyd 1901" spacer (trade name, American Cyanamid) or a bearing pad or pin spacer would be suitable but it is preferred that a "resin-impregnated felt rubber" sandwich spacer be used. The nature of the sandwich spacer is more fully described in U.S. Pat. application No. 152,679 filed on behalf of Niko V. Gjaja and of even date with the present application and assigned to the assignee of the present application.

The first and second support rings are tied by a glass impregnated "kinked" roving tie wrap 63, the kink 65 being formed as the resin cures. This kink 65 contributes the spring characteristic to the support rings as will later be more thoroughly described. The second support ring is attached to the outer floating support by means of a glass impregnated roving tie wrap 67 which passes through hole 71 in the outer floating supports. The manner in which this tie is formed is fully disclosed in U.S. Pat. No. 3,566,010 issued Feb. 23, 1971 to Drexler and Bishop and assigned to the assignee of the present invention.

Another embodiment is shown in FIG. 3. Parts similar to those numbered in FIG. 2 will receive like numbers. In this embodiment, the support ring 51 is shown as fixed to the stator core 12. It could also be fixed to a flange on the dynamoelectric machine 11 as shown in FIG. 1. In this embodiment only one support ring is used and the sandwich spacer 61 is disposed between the underside of a floating outer support 31 and the support ring. The glass impregnated roving tie wrap 63 is drawn around the support ring and through a hole 72 in the floating outer support. There is a kink 65 also in this tie wrap.

In FIGS. 4 and 5 there is shown an insulated end winding designated as a phase jumper 111. A support ring 113 formed with a flange 115 is concentrically mounted with respect to the stator core. The flange 115 results in a more favorable geometry for axial movement and can also be applied in any previously mentioned embodiment. Note the upper and lower stator bars 117 and 119 which emerge from the stator core and are electrically connected into the phase jumper 111.

The support ring 113 is attached to an axially extending outer support 121 by means of a glass impregnated roving "FIG. 8" tie wrap 123. The wrap passes through a pair of holes 125 in the face of the support ring and a third hole 127 in the outer floating support. There may be a spacer 129 disposed between the support ring and the outer floating support. A dowel 131 is used to rigidly mount the support ring 113 to the outer floating support. Again, the manner in which the support ring is attached to the axial support is shown in U.S. Pat. No. 3,566,010 issued Feb. 23, 1971 to Drexler and Bishop and assigned to the assignee of the present invention.

As is apparent from FIG. 4, the support ring is formed with an inner circumferential groove 135 as well as a series of notched portions 137 to accommodate a sandwich spacer 139. Again a "Glaskyd" sausage could be used, but it is preferred to use the felt rubber sandwich spacer.

The spacer is inserted between the phase jumper 111 and the support ring 113, in the groove 135 provided. The phase jumper, the support ring and the sandwich spacer therebetween are tied together by a pair of glass impregnated roving tie wraps 141 having a kinked portion 143. There may be other conventional tie wraps 145 to fasten excess spacers to the support ring as shown.

OPERATION OF THE INVENTION

The end windings of the dynamoelectric machine are subjected to forces in the tangential, radial and axial direction. Radial and tangential forces are constrained by means of the roving tension tie wrap, designated as 63 in FIGS. 1 to 3 and as 141 in FIGS. 4 and 5, as well as by the felt sandwich spacer or the "Glaskyd" spacer. However, axial movement due to low cycle thermal expansion is permitted because of the following construction features.

The geometry of the support rings as well as their orientation to one another is one contributor allowing axial displacement. As seen in FIGS. 1 and 2, when two support rings are used, the cross section height to width ratio is such that the tie wrap must allow some axial flexing. In addition, if the first or outer support ring had a slightly greater cross sectional width than the cross sectional width of the second or inner support ring, then axial flexure will be similar to that later described for FIGS. 4 and 5. In FIG. 3, since there is only one support ring, the top portion is free to move axially. In FIGS. 4 and 5, there is one support ring having a flange portion which together with a significant cross section height to width ratio promotes axial movement.

The construction feature which promotes axial movement due to low cycle thermal expansion is the clearance portion in the tie wrap between the wrap and the support members which gives a "spring characteristic" to the support ring or rings. The spring characteristic is provided by locating or forming the tie so that it does not contact the sides of the support rings thus forming a spring which may be deflected in its traverse direction. This traverse direction being so oriented as to permit axial movement of the floating members. The above clearance may arise from a kink formed in the tie or because of the geometry of the supporting rings.

The sandwich spacer between the support rings or between the support ring and outer floating support or between the support ring and phase jumper promotes axially motion forward and backward because the elastomeric or rubber portion of the sandwich allows axial motion.

End winding misalignment may be accommodated by using various size spacers between supports and supported structures.

While there is shown what is considered to be the preferred embodiment of the invention, it is of course understood that various other modifications may be made therein, and it is intended to cover in the appended claims all such modifications as fall within the true spirit and scope of the invention.

What is claimed:

1. An insulating support, having flexibility in an axial direction, supporting electrical conductors in the end winding region of a dynamoelectric machine, said support comprising:
   a fixed support member;
   a movable member disposed radially adjacent said fixed member;
   a flexible spacer positioned between said fixed member and said movable member;
   a rigid, resin impregnated, radial tie encircling said members and said spacer; and,
   clearances, in the axial direction formed between said tie and the sides of said members and said spacer whereby limited axial movement is permitted.

2. An insulating support, having unidirectional flexibility, for the end winding region of a dynamoelectric machine, said support comprising:
   at least one first support ring substantially concentric with said dynamoelectric machine and fixed thereto;
   end winding members adjacent said first support ring;
   at least one flexible spacer positioned between said first support ring and said end winding members; and
   a kinked tension tie wrap about said support ring, said end winding members and said spacer whereby relative movement in the radial direction is prevented while relative axial movement is permitted.

3. The support as recited in claim 2 wherein the spacer is a felt and rubber multi-ply construction.

4. The support as recited in claim 2 wherein the end winding members include at least one floating outer support to which a plurality of stator bars are attached.

5. The support as recited in claim 4 wherein the kinked tension tie wrap is tied about the first support ring, the spacer and the floating outer support.

6. In a dynamoelectric machine including a stator core having a plurality of stator bars extending generally axially therefrom into an end winding region; an insulating end winding support comprising:
   at least one first support ring substantially concentric with said dynamoelectric machine and fixed thereto;
   at least one floating outer support member having the stator bars attached thereto;
   a spacer positioned between said first support ring and said floating outer support member; and
   a kinked tension tie wrap about said first support ring, said outer floating support member and said spacer whereby relative movement in the radial direction is prevented while relative axial movement is permitted.

7. In a dynamoelectric machine including a stator core having a plurality of stator bars extending generally axially therefrom into an end winding region; an insulating end winding support comprising:
   at least one first support ring substantially concentric with said dynamoelectric machine and fixed thereto;
   at least one floating outer support member having the stator bars attached thereto;
   at least one second support ring substantially concentric with said first support ring and fixed to said floating outer support member;
   a spacer positioned between said first and second support rings; and
   a kinked tension tie wrap about said first and second support rings and said spacer whereby relative movement in the radial direction is prevented while relative axial movement is permitted.

8. In a dynamoelectric machine including a stator core having a plurality of end winding members extending generally axially therefrom into an end winding region; an insulating end winding support comprising:
   a generally axially extending support member;
   a first support ring attached to said axially extending support member;
   at least one end winding member adjacent said first support ring;
   at least one flexible spacer positioned between said end winding member and said support ring; and,
   a rigid, resin impregnated, tie encircling said support ring, said flexible spacer and said end winding member; and
   a clearance formed between said tie and said end winding member, said spacer and said support ring.

9. The support as defined in claim 8 wherein the end winding member is a phase jumper.

10. The support as defined in claim 8 wherein the support ring has a flange formed on its outer circumference whereby said clearance is formed.

11. The support as defined in claim 8 wherein the tie is kinked whereby said clearance is formed.

* * * * *